(12) United States Patent
Vankamamidi et al.

(10) Patent No.: US 11,726,851 B2
(45) Date of Patent: Aug. 15, 2023

(54) STORAGE MANAGEMENT SYSTEM AND METHOD

(71) Applicant: EMC IP Holding Company, LLC, Hopkinton, MA (US)

(72) Inventors: Vamsi K. Vankamamidi, Newton, MA (US); Philippe Armangau, Acton, MA (US); Socheavy D. Heng, Framingham, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 85 days.

(21) Appl. No.: 16/674,477

(22) Filed: Nov. 5, 2019

(65) Prior Publication Data

US 2021/0133011 A1 May 6, 2021

(51) Int. Cl.
*G06F 11/00* (2006.01)
*G06F 11/07* (2006.01)
*G06F 11/14* (2006.01)
*G06F 1/30* (2006.01)
*G06F 11/30* (2006.01)
*G06F 12/0882* (2016.01)
*G06F 11/20* (2006.01)

(52) U.S. Cl.
CPC .............. *G06F 11/073* (2013.01); *G06F 1/30* (2013.01); *G06F 11/1435* (2013.01); *G06F 11/1469* (2013.01); *G06F 11/2084* (2013.01); *G06F 11/3037* (2013.01); *G06F 12/0882* (2013.01)

(58) Field of Classification Search
CPC ......... G06F 11/1471; G06F 2212/7207; G06F 11/0793; G06F 11/28; G06F 11/073; G06F 11/1435; G06F 11/3037; G06F 3/0619
See application file for complete search history.

(56) References Cited

U.S. PATENT DOCUMENTS

| | | | | |
|---|---|---|---|---|
| 6,993,042 B1* | 1/2006 | Akatsuka | ............ | H04L 12/4035 370/230 |
| 7,350,105 B2* | 3/2008 | Aasheim | ............... | G06F 3/0679 714/24 |
| 7,631,009 B1* | 12/2009 | Patel | ................... | G06F 11/1004 |
| 7,657,796 B1* | 2/2010 | Kaiser | ................. | G06F 11/1435 714/54 |
| 7,707,184 B1* | 4/2010 | Zhang | ................. | G06F 11/1471 707/645 |
| 7,805,632 B1* | 9/2010 | Luke | ................... | G06F 11/1471 714/6.12 |
| 7,975,061 B1* | 7/2011 | Gokhale | ............... | G06F 3/0683 709/231 |

(Continued)

*Primary Examiner* — Loan L. T. Truong
(74) *Attorney, Agent, or Firm* — Brian J. Colandreo; Heath M. Sargeant; Holland & Knight LLP (57) ABSTRACT

A method, computer program product, and computing system for processing memory page metadata received from a cache memory system within a data storage system to determine if the memory page metadata includes corruption due to a power failure event; if the memory page metadata includes post-acknowledgement data corruption, initiating a data recovery process to attempt to recover content associated with the post-acknowledgement data corruption; and if the memory page metadata includes pre-acknowledgement data corruption, reobtaining content associated with the pre-acknowledgement data corruption.

13 Claims, 3 Drawing Sheets

(56) References Cited

U.S. PATENT DOCUMENTS

| | | | | |
|---|---|---|---|---|
| 7,991,849 B1* | 8/2011 | Ponomarenko | G06F 16/20 | 709/212 |
| 8,194,341 B1* | 6/2012 | Boyle | G11B 5/09 | 360/53 |
| 8,612,706 B1* | 12/2013 | Madril | G06F 3/0676 | 711/162 |
| 8,756,361 B1* | 6/2014 | Carlson | G11B 27/322 | 711/4 |
| 9,274,937 B2* | 3/2016 | Batwara | G06F 3/0688 | |
| 9,916,191 B1* | 3/2018 | Pan | G06F 11/0763 | |
| 10,013,354 B2* | 7/2018 | Flynn | G06F 11/1471 | |
| 10,417,190 B1* | 9/2019 | Donlan | G06F 16/128 | |
| 10,587,491 B1* | 3/2020 | Volpe | H04L 41/0803 | |
| 10,949,289 B1* | 3/2021 | Monakhov | G06F 3/0673 | |
| 2003/0163594 A1* | 8/2003 | Aasheim | G06F 11/1435 | 719/310 |
| 2004/0249869 A1* | 12/2004 | Oksanen | G06F 11/2094 | |
| 2005/0125549 A1* | 6/2005 | Katayama | H04L 67/10 | 709/230 |
| 2006/0053181 A1* | 3/2006 | Anand | G06F 11/1469 | |
| 2006/0106971 A1* | 5/2006 | Mahar | G06F 3/064 | 711/100 |
| 2006/0179211 A1* | 8/2006 | Aasheim | G06F 12/0246 | 711/103 |
| 2007/0174353 A1* | 7/2007 | Adkins | G06F 11/0727 | |
| 2007/0203934 A1* | 8/2007 | Anderson | G06F 40/186 | |
| 2008/0151724 A1* | 6/2008 | Anderson | G11B 33/127 | 369/53.42 |
| 2009/0089508 A1* | 4/2009 | Trika | G06F 12/0804 | 711/135 |
| 2011/0302474 A1* | 12/2011 | Goss | G06F 12/0246 | 711/E12.078 |
| 2013/0339315 A1* | 12/2013 | Stoakes | G06F 3/0683 | 707/E17.005 |
| 2014/0047161 A1* | 2/2014 | Nemazie | G06F 12/0246 | 711/103 |
| 2014/0050217 A1* | 2/2014 | Janakiraman | H04L 45/7453 | 370/389 |
| 2016/0179618 A1* | 6/2016 | Resch | G06F 21/80 | 714/764 |
| 2016/0378621 A1* | 12/2016 | Amidi | G06F 11/1441 | 714/6.2 |
| 2017/0097873 A1* | 4/2017 | Krishnamachari | G06F 11/1474 | |
| 2017/0212690 A1* | 7/2017 | Babu | G06F 3/0608 | |
| 2017/0293536 A1* | 10/2017 | Won | G06F 11/1446 | |
| 2018/0088815 A1* | 3/2018 | Lei | G06F 3/064 | |
| 2018/0183901 A1* | 6/2018 | Lariviere | H04L 47/10 | |
| 2019/0132353 A1* | 5/2019 | Rodniansky | H04L 67/561 | |
| 2019/0179687 A1* | 6/2019 | Wilkinson | G06F 11/2221 | |
| 2019/0332495 A1* | 10/2019 | Fair | G06F 11/1464 | |
| 2019/0347168 A1* | 11/2019 | Giannetti | G06F 9/485 | |
| 2021/0109759 A1* | 4/2021 | Ugale | G06F 9/544 | |
| 2021/0109780 A1* | 4/2021 | Ugale | G06F 11/3024 | |

* cited by examiner

10 processing memory page metadata received from a cache memory system within a data storage system to determine if the memory page metadata includes corruption due to a power failure event (200)

↓ if the memory page metadata includes post-acknowledgement data corruption, initiating a data recovery process to attempt to recover memory page data associated with the post-acknowledgement data corruption (206)

↓ if the memory page metadata includes pre-acknowledgement data corruption, reobtaining memory page data associated with the pre-acknowledgement data corruption (208)

examining a checksum included within the memory page metadata to determine if the memory page metadata was corrupted during the power failure event (202)

examining one or more sequence IDs included within the memory page metadata to determine if the memory page metadata was corrupted during the power failure event (204)

deleting the memory page metadata that includes the pre-acknowledgement data corruption (210)

deleting memory page data currently associated with the pre-acknowledgement data corruption (212)

obtaining replacement memory page data associated with the pre-acknowledgement data corruption from a client (214)

generating replacement memory page metadata for the replacement memory page data (216)

storing the replacement memory page data and the replacement memory page metadata on the cache memory system (218)

FIG. 3

STORAGE MANAGEMENT SYSTEM AND METHOD

TECHNICAL FIELD

This disclosure relates to storage management processes and, more particularly, to storage management processes for use in high-availability storage systems.

BACKGROUND

Storing and safeguarding electronic content is of paramount importance in modern business. Accordingly, various methodologies may be employed to protect and distribute such electronic content, wherein the storage systems that process such content may strive to do so in as an efficient manner as possible. Unfortunately and due to the complexity of such storage systems, power failures that occur during data write operations may lead to data corruption.

SUMMARY OF DISCLOSURE

In one implementation, a computer-implemented method is executed on a computing device and includes: processing memory page metadata received from a cache memory system within a data storage system to determine if the memory page metadata includes corruption due to a power failure event; if the memory page metadata includes post-acknowledgement data corruption, initiating a data recovery process to attempt to recover content associated with the post-acknowledgement data corruption; and if the memory page metadata includes pre-acknowledgement data corruption, reobtaining content associated with the pre-acknowledgement data corruption.

One or more of the following features may be included. Processing memory page metadata received from a cache memory system within a data storage system to determine if the memory page metadata includes corruption due to a power failure event may include: examining a checksum included within the memory page metadata to determine if the memory page metadata was corrupted during the power failure event. Processing memory page metadata received from a cache memory system within a data storage system to determine if the memory page metadata includes corruption due to a power failure event may include: examining one or more sequence IDs included within the memory page metadata to determine if the memory page metadata was corrupted during the power failure event. Reobtaining content associated with the pre-acknowledgement data corruption may include: deleting the memory page metadata that includes the pre-acknowledgement data corruption; and deleting content currently associated with the pre-acknowledgement data corruption. Reobtaining content associated with the pre-acknowledgement data corruption may further include: obtaining replacement content associated with the pre-acknowledgement data corruption from a client; and generating replacement memory page metadata for the replacement content. Reobtaining content associated with the pre-acknowledgement data corruption may further include: storing the replacement content and the replacement memory page metadata on the cache memory system. The data recovery process may include: a file system checking process.

In another implementation, a computer program product resides on a computer readable medium and has a plurality of instructions stored on it. When executed by a processor, the instructions cause the processor to perform operations including: processing memory page metadata received from a cache memory system within a data storage system to determine if the memory page metadata includes corruption due to a power failure event; if the memory page metadata includes post-acknowledgement data corruption, initiating a data recovery process to attempt to recover content associated with the post-acknowledgement data corruption; and if the memory page metadata includes pre-acknowledgement data corruption, reobtaining content associated with the pre-acknowledgement data corruption.

One or more of the following features may be included. Processing memory page metadata received from a cache memory system within a data storage system to determine if the memory page metadata includes corruption due to a power failure event may include: examining a checksum included within the memory page metadata to determine if the memory page metadata was corrupted during the power failure event. Processing memory page metadata received from a cache memory system within a data storage system to determine if the memory page metadata includes corruption due to a power failure event may include: examining one or more sequence IDs included within the memory page metadata to determine if the memory page metadata was corrupted during the power failure event. Reobtaining content associated with the pre-acknowledgement data corruption may include: deleting the memory page metadata that includes the pre-acknowledgement data corruption; and deleting content currently associated with the pre-acknowledgement data corruption. Reobtaining content associated with the pre-acknowledgement data corruption may further include: obtaining replacement content associated with the pre-acknowledgement data corruption from a client; and generating replacement memory page metadata for the replacement content. Reobtaining content associated with the pre-acknowledgement data corruption may further include: storing the replacement content and the replacement memory page metadata on the cache memory system. The data recovery process may include: a file system checking process.

In another implementation, a computing system includes a processor and memory is configured to perform operations including: processing memory page metadata received from a cache memory system within a data storage system to determine if the memory page metadata includes corruption due to a power failure event; if the memory page metadata includes post-acknowledgement data corruption, initiating a data recovery process to attempt to recover content associated with the post-acknowledgement data corruption; and if the memory page metadata includes pre-acknowledgement data corruption, reobtaining content associated with the pre-acknowledgement data corruption.

One or more of the following features may be included. Processing memory page metadata received from a cache memory system within a data storage system to determine if the memory page metadata includes corruption due to a power failure event may include: examining a checksum included within the memory page metadata to determine if the memory page metadata was corrupted during the power failure event. Processing memory page metadata received from a cache memory system within a data storage system to determine if the memory page metadata includes corruption due to a power failure event may include: examining one or more sequence IDs included within the memory page metadata to determine if the memory page metadata was corrupted during the power failure event. Reobtaining content associated with the pre-acknowledgement data corruption may include: deleting the memory page metadata that includes the pre-acknowledgement data corruption; and deleting content currently associated with the pre-acknowledgement data corruption. Reobtaining content associated with the pre-acknowledgement data corruption may further include: obtaining replacement content associated with the pre-acknowledgement data corruption from a client; and generating replacement memory page metadata for the replacement content. Reobtaining content associated with the pre-acknowledgement data corruption may further include: storing the replacement content and the replacement memory page metadata on the cache memory system. The data recovery process may include: a file system checking process.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
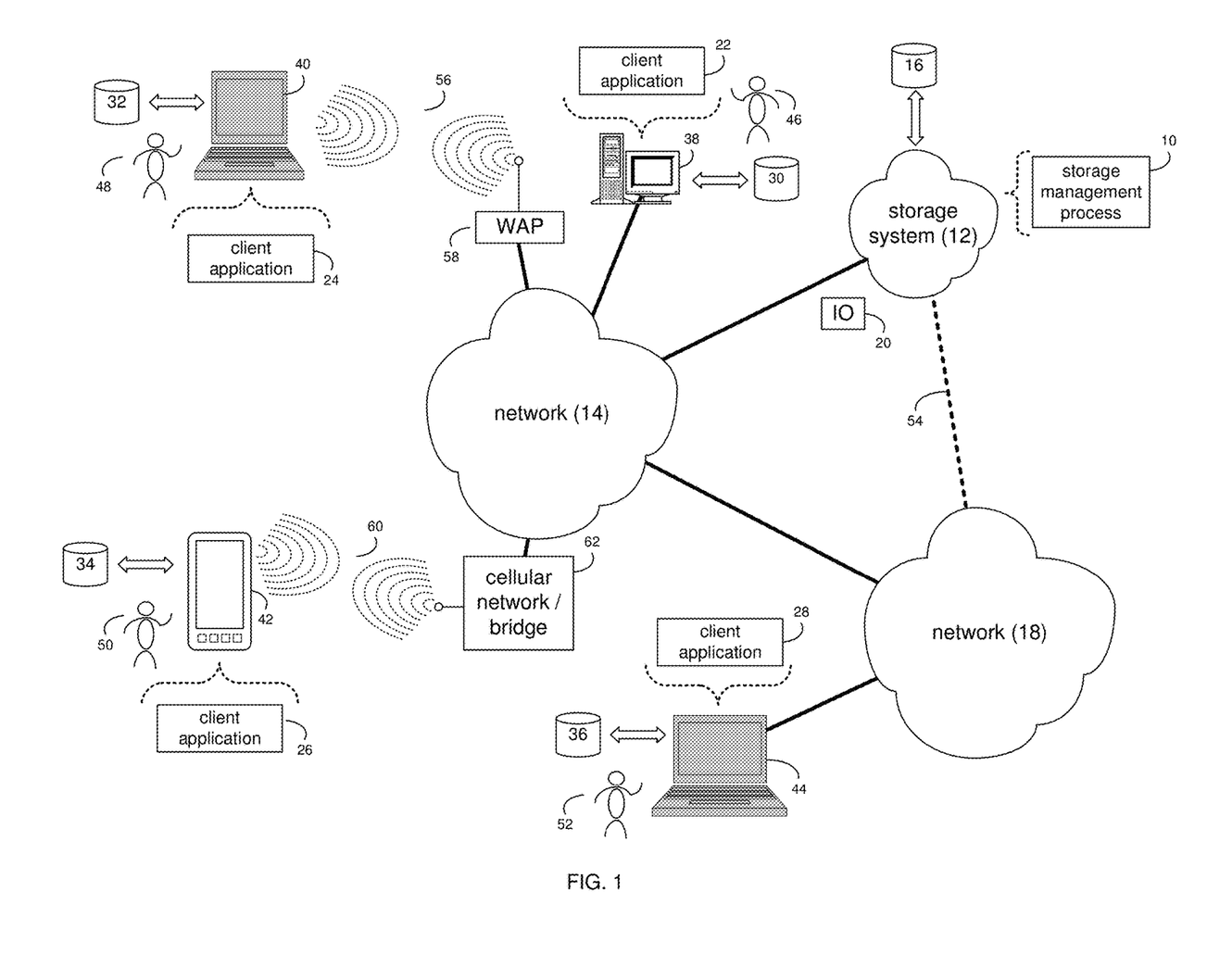
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™, or a custom operating system.

Figure 2:
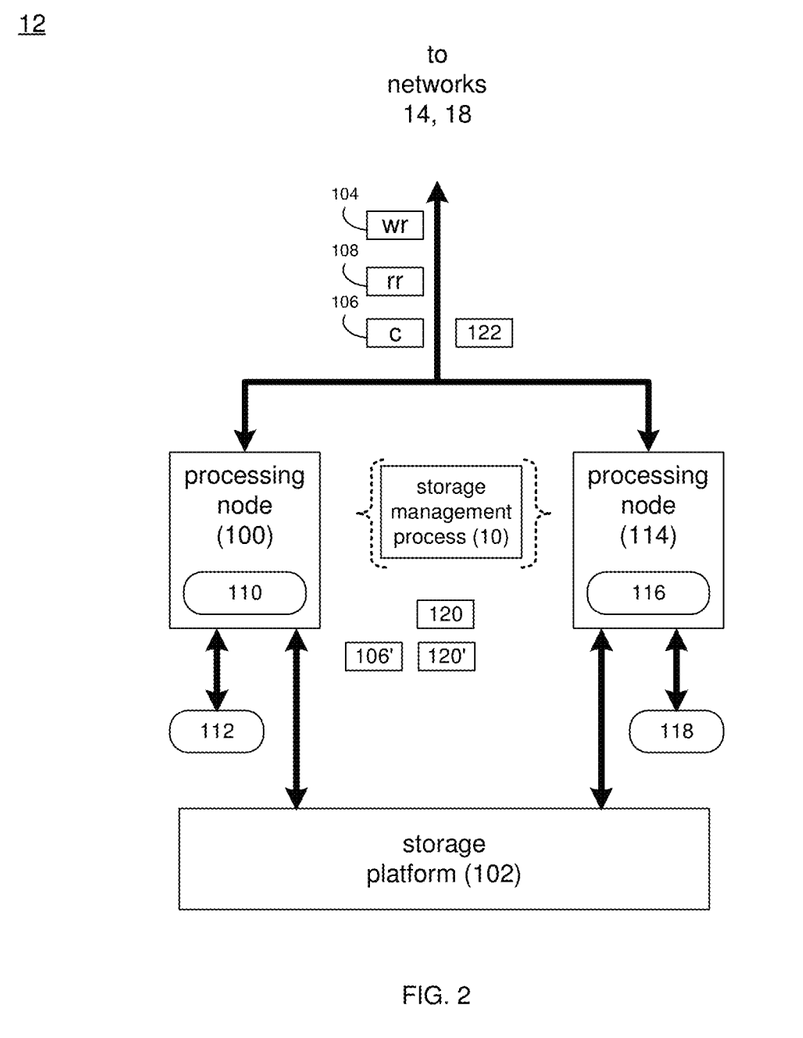
FIG. 2 is a diagrammatic view of the storage system of FIG. 1.

The Data Storage System:

Referring also to FIG. 2, there is shown a general implementation of storage system 12. In this general implementation, storage system 12 may include processing node 100. Processing node 100 may be configured to perform computational tasks and store data within storage platform 102.

Depending upon the manner in which storage system 12 is configured, storage platform 102 may include a single storage device (such as a single hard disk drive or a single solid state storage device) or may include a plurality of storage devices that are configured to provide various levels of performance and/or high availability. For example and if storage platform 102 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 16) coupled to e.g., processing node 100, may be executed by one or more processors (not shown) and one or more memory architectures (not shown) included within processing node 100.

As discussed above, various IO requests (e.g. IO request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 104 (i.e. a request that content 106 be written to storage system 12) and data read request 108 (i.e. a request that content 106 be read from storage system 12).

During operation of processing node 100, content 106 to be written to storage system 12 may be processed by processing node 100. Additionally/alternatively and when storage system 12 is configured as an application server, content 106 to be written to storage system 12 may be internally generated by processing node 100. Processing node 100 may include buffer 110 (e.g., a portion of volatile memory) for initially storing content 106.

Processing node 100 may include/be coupled to cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may move content 106 (which is currently stored within buffer 110) to cache memory system 112. Depending upon the manner in which cache memory system 112 is configured, processing node 100 may a) immediately write content 106 to storage platform 102 (if cache memory system 112 is configured as a write-through cache) or b) may subsequently write content 106 to storage platform 102 (if cache memory system 112 is configured as a write-back cache).

Storage system 12 may be configured to include a plurality of processing nodes, each of which may be configured to receive, generate and/or process content (e.g., content 106). For example and in addition to processing node 100, storage system 12 may include one or more additional processing nodes (e.g., processing node 114). Processing node 114 may also be configured to perform computational tasks and store data within storage platform 104.

Processing node 114 may include buffer 116 (e.g., a portion of volatile memory) for initially storing content 106. Processing node 114 may include/be coupled cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may move content 106 (which is currently stored within buffer 116) to cache memory system 118. Depending upon the manner in which cache memory system 118 is configured, processing node 114 may a) immediately write content 106 to storage platform 102 (if cache memory system 118 is configured as a write-through cache) or b) may subsequently write content 106 to storage platform 102 (if cache memory system 118 is configured as a write-back cache).

Storage Management Process:

As in known in the art, content 106 may be formed from a plurality of similarly-sized data portions, an example of which may include but is not limited to a plurality of 4 k memory pages. Accordingly, if content 106 is a 48 kilobyte data file, it may include twelve 4 k memory pages. Additionally and as is known in the art, each of these data portions (e.g., each 4 k memory page) may have memory page metadata (e.g., memory page metadata 120) that identifies the location of these memory pages within e.g., cache memory system 112 and/or storage platform 102.

As discussed above, when content 106 is received by processing node 100, content 106 may be initially stored within buffer 110. Content 106 may then be moved to cache memory system 112 and subsequently to storage platform 102. For example and upon storing content 106 within buffer 110, storage management process 10 may notify cache memory system 112 that content 106 is stored within buffer 110 and needs to be written to cache memory system 112. Cache memory system 112 may then use a DMA (i.e., Direct Memory Access) channel to access buffer 110 so that content 106 may be read from buffer 110 and written to cache memory system 112. Once content 106 is stored within cache memory system 112, memory page metadata 120 may be generated to define the specific location of content 106 within cache memory system 112. That way, in the event that processing node 100 receives a read request (e.g., read request 108) for content 106, the location of content 106 within cache memory system 112 may be determined by processing memory page metadata 120.

As discussed above, content 106 may subsequently be moved to storage platform 102. For example, storage management process 10 may obtain content 106 from cache memory system 112 and write content 106 to storage platform 102. This retrieval of content 106 from cache memory system 112 and/or the subsequent writing of content 106 to storage platform 102 may be accomplished via DMA channel memory access (as discussed above). Once content 106 is stored within storage platform 102, memory page metadata 120 may define the specific location of content 106 within storage platform 102. That way, in the event that processing node 100 receives a read request (e.g., read request 108) for content 106, the location of content 106 within storage platform 102 may be determined by processing memory page metadata 120.

As could be imagined, in the event that memory page metadata 120 gets corrupted, storage management process 10 may not be able to locate content 106 within e.g., cache memory system 112 and/or storage platform 102. For example and as discussed above, cache memory system 112 may first write content 106 to cache memory system 112; and cache memory system 112 may then write memory page metadata 120 that locates content 106 within cache memory system 112. Once cache memory system 112 successfully writes memory page metadata 120 within cache memory system 112, storage management process 10 may provide an acknowledgement to the client that generated write request 104 (e.g., one of client electronic devices 38, 40, 42, 44) confirming that content 106 was received and stored on storage system 12. In the event that such an acknowledgement is not received by the client (e.g., one of client electronic devices 38, 40, 42, 44), the client (e.g., one of client electronic devices 38, 40, 42, 44) will assume that the write request (e.g., write request 104) and/or the content (e.g., content 106) was lost or corrupted and, therefore, was never received by processing node 100. Accordingly, the client (e.g., one of client electronic devices 38, 40, 42, 44)

will retransmit the write request (e.g., write request 104) and the content (e.g., content 106) to storage system 12.

As discussed above, content 106 may be formed from a plurality of similarly-sized data portions, wherein an example of content 106 may include but is not limited to a plurality of 4 k memory pages. Further and as discussed above, each of these data portions (e.g., each of these 4 k memory pages) may have memory page metadata (e.g., memory page metadata 120) that identifies the location of these memory pages within e.g., cache memory system 112 and/or storage platform 102.

For the following example, assume that content 106 is eight kilobytes in size and, therefore, includes two 4 k memory pages. Further, assume that content 106 was received by processing node 100 and stored within buffer 110; and that cache memory system 112 is in the process of writing content 106 to cache memory system 112 and generating memory page metadata 120 when a power failure event (e.g., a wide spread power failure) occurs. As discussed above, cache memory system 112 may include but are not limited to a volatile, solid-state, cache memory system (e.g., a static RAM cache memory system) and/or a non-volatile, solid-state, cache memory system (e.g., a flash-based, cache memory system). Accordingly, assume that at the time of the power failure event (e.g., a wide spread power failure), cache memory system 112 automatically writes all data from the volatile, solid-state, cache memory system (e.g., a static RAM cache memory system) to the non-volatile, solid-state, cache memory system (e.g., a flash-based, cache memory system). Unfortunately and due to the power failure event (e.g., a wide spread power failure), memory page metadata 120 stored within the non-volatile, solid-state, cache memory system (e.g., a flash-based, cache memory system) of cache memory system 112 may be incomplete and/or corrupt.

For this example, assume that memory page metadata 120 is 512 bytes in size (i.e., a sector) and is written in two 256 byte portions, wherein each of these 256 byte portions may be written 32 bytes at a time. Accordingly and when cache memory system 112 is writing memory page metadata 120 (i.e., a 512 byte sector), a first group of eight 32 byte write operations may be required to write the first 256 byte portion of memory page metadata 120 and a second group of eight 32 byte write operations may be required to write the second 256 byte portion of memory page metadata 120. Accordingly and in the event that the power failure event (e.g., a wide spread power failure) occurs while writing memory page metadata 120, memory page metadata 120 may be corrupted, which may complicate the ability of storage management process 10 to locate content 106 within cache memory system 112.

Figure 3:
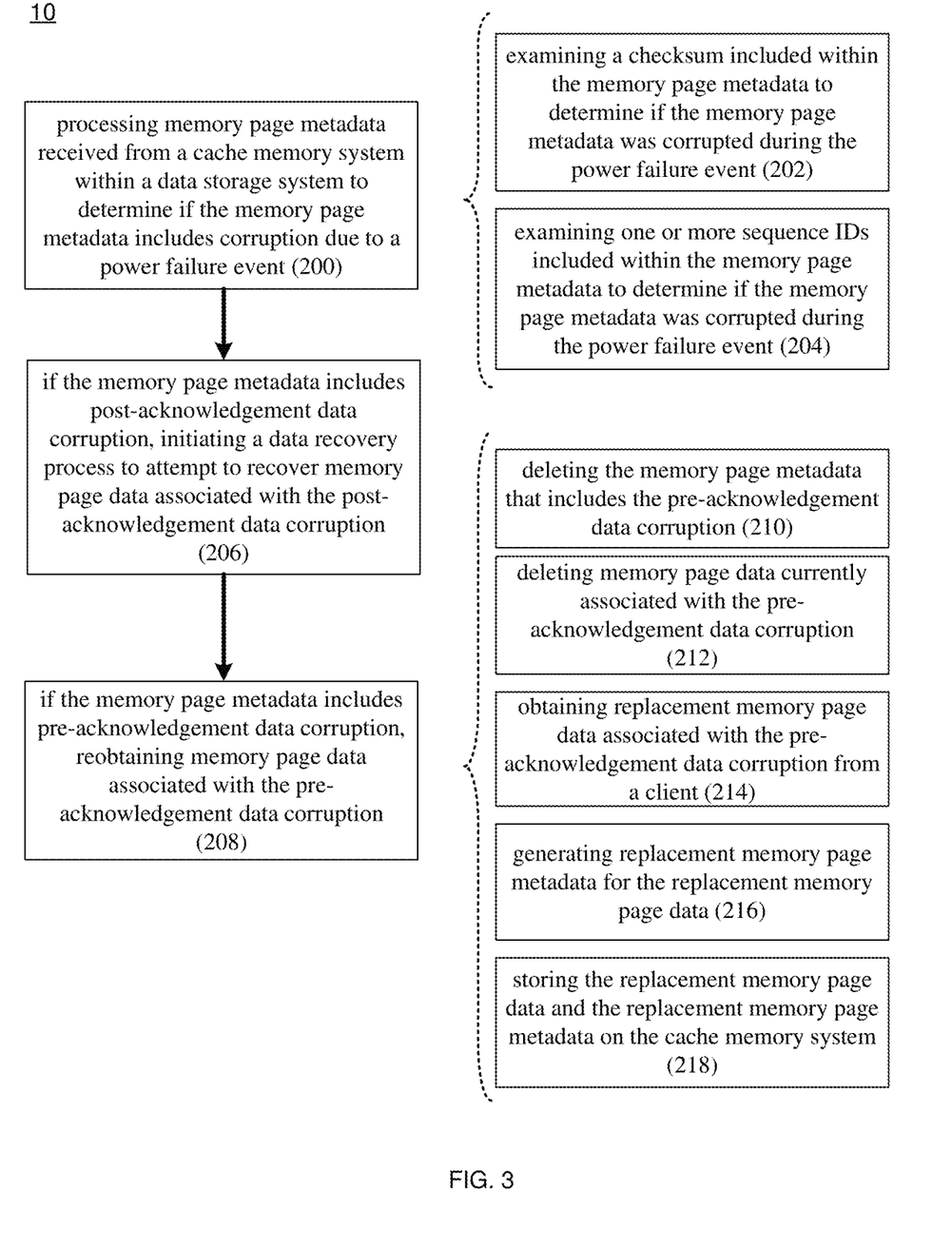
FIG. 3 is a flow chart of the storage management process of FIG. 1.

Referring also to FIG. 3, storage management process 10 may process 200 memory page metadata (e.g., memory page metadata 120) received from a cache memory system (e.g., cache memory system 112) within a data storage system (e.g., storage system 12) to determine if the memory page metadata (e.g., memory page metadata 120) includes corruption due to the power failure event (e.g., a wide spread power failure). Assume for this example that after the power failure event (e.g., a wide spread power failure) is resolved, storage system 12 may restart and storage management process 10 may obtain a copy of memory page metadata (e.g., memory page metadata 120) from cache memory system 112 and may process 200 the same.

Memory page metadata 120 (which, as discussed above, may be a 512 byte sector in size) may include:

- Header Information: A Sequence-ID and other information/fields;
- A Payload: Various Client-Specific Information; and
- Footer Information: A Sequence-ID, a Checksum (of the Header Information+the Payload) and other information/fields.

The Sequence-ID may be a monotonically increasing counter that is used to identify the sector being written. For example, the memory storage device into which memory page metadata 120 is written may be a circular memory structure that includes a defined number of storage locations. Accordingly, if this circular memory structure include 1,024 memory locations (e.g., locations 0-1,023), once the last of these memory locations (e.g., location 1,023) is filed, cache memory system 112 may overwrite the first memory location (e.g., location 0). And being that memory page metadata 120 is 512 bytes in size, the writing of memory page metadata 120 may be accomplished via two 256 byte write operations. Assuming that the writing of memory page metadata 120 was successfully completed, the sequence-ID in the header information should be the same as the sequence-ID in the footer information. However, in the event that only the first or second 256 byte portion of memory page metadata 120 was written (e.g., due to the above-described power failure event), the sequence-ID of the header information will not match the sequence-ID of the footer information.

Continuing with the above-stated example, when processing 200 memory page metadata (e.g., memory page metadata 120) received from a cache memory system (e.g., cache memory system 112) within a data storage system (e.g., storage platform 102) to determine if the memory page metadata (e.g., memory page metadata 120) includes corruption due to a power failure event (e.g., a wide spread power failure), storage management process 10 may examine 202 a checksum included within the memory page metadata (e.g., memory page metadata 120) to determine if the memory page metadata (e.g., memory page metadata 120) was corrupted during the power failure event (e.g., a wide spread power failure).

Further and when processing 200 memory page metadata (e.g., memory page metadata 120) received from a cache memory system (e.g., cache memory system 112) within a data storage system (e.g., storage platform 102) to determine if the memory page metadata (e.g., memory page metadata 120) includes corruption due to a power failure event (e.g., a wide spread power failure), storage management process 10 may examine 204 one or more sequence IDs included within the memory page metadata (e.g., memory page metadata 120) to determine if the memory page metadata (e.g., memory page metadata 120) was corrupted during the power failure event (e.g., a wide spread power failure).

The embedded table below provides one illustrative and non-limiting example of the manner in which the checksum included within the memory page metadata (e.g., memory page metadata 120) may be examined 202 and/or the sequence IDs included within the memory page metadata (e.g., memory page metadata 120) may be examined 204.

| Checksum | SeqID-Hdr | SeqID-Ftr | Sector-state | Determination |
|---|---|---|---|---|
| good | new | new | good | cache write completed |
| good | old | old | good | cache write not started |

-continued

| Checksum | SeqID-Hdr | SeqID-Ftr | Sector-state | Determination |
|---|---|---|---|---|
| good | invalid | invalid | corruption | misdirected write or wrong buffer |
| bad | new | old | Sector-splice | power failure event |
| bad | old | new | Sector-splice | power failure event |
| bad | invalid | invalid | corruption | buffer corruption |
| bad | old | old | corruption | middle of buffer corrupted |
| bad | new | new | corruption | middle of buffer corrupted |
| bad | new/old | invalid | corruption (or) sector-splice | buffer corruption (or) sector-splice on SeqID-Ftr |
| bad | invalid | new/old | corruption (or) sector-splice | buffer corruption (or) sector-splice on SeqID-Hdr |

Generally speaking:

Invalid Sequence IDs (regardless of checksum status) is indicative of corruption.

Bad Checksums with matching sequence IDs (either both old or both new) is indicative of corruption As discussed above, once cache memory system 112 successfully writes memory page metadata 120 within cache memory system 112, storage management process 10 may provide an acknowledgement (e.g., acknowledgement 122) to the client that generated write request 104 (e.g., one of client electronic devices 38, 40, 42, 44) confirming that content 106 was received and stored on storage system 12. In the event that such an acknowledgement (e.g., acknowledgement 122) is not received by the client (e.g., one of client electronic devices 38, 40, 42, 44), the client (e.g., one of client electronic devices 38, 40, 42, 44) will assume that the write request (e.g., write request 104) and/or the content (e.g., content 106) was lost or corrupted and, therefore, was never received by processing node 100. Accordingly, the client (e.g., one of client electronic devices 38, 40, 42, 44) will retransmit the write request (e.g., write request 104) and the content (e.g., content 106) to storage system 12.

Post-Acknowledgement Data Corruption:

If the memory page metadata (e.g., memory page metadata 120) includes post-acknowledgement data corruption, storage management process 10 may initiate 206 a data recovery process to attempt to recover content associated with the post-acknowledgement data corruption. In such a situation, the acknowledgement (e.g., acknowledgement 122) was sent to the client (e.g., one of client electronic devices 38, 40, 42, 44) confirming that content 106 was received and stored on storage system 12. Accordingly, the client (e.g., one of client electronic devices 38, 40, 42, 44) will not be resending content 106. Accordingly, storage management process 10 may initiate 206 a data recovery process (e.g., file system checking process, such as FSCK or CHKDSK) to attempt to recover content 106 associated with the post-acknowledgement data corruption.

As is known in the art, the system utility FSCK (i.e., file system consistency check) is a tool for checking the consistency of a file system in Unix and Unix-like operating systems, such as Linux, macOS, and FreeBSD. A similar command, CHKDSK, exists in Microsoft Windows and (its ancestor) MS-DOS.

Generally, FSCK is run either automatically at boot time, or manually by the system administrator. The command may work directly on data structures stored on disk, which are internal and specific to the particular file system in use—so an FSCK command tailored to the file system is generally required. The exact behaviors of various FSCK implementations vary, but they typically follow a common order of internal operations and provide a common command-line interface to the user. Most FSCK utilities provide options for either interactively repairing damaged file systems (the user must decide how to fix specific problems), automatically deciding how to fix specific problems (so the user does not have to answer any questions), or reviewing the problems that need to be resolved on a file system without actually fixing them. Partially recovered files where the original file name cannot be reconstructed are typically recovered to a "lost+found" directory that is stored at the root of the file system.

Pre-Acknowledgement Data Corruption:

If the memory page metadata (e.g., memory page metadata 120) includes pre-acknowledgement data corruption, storage management process 10 may reobtain 208 content (e.g., content 106) associated with the pre-acknowledgement data corruption. As discussed above, if an acknowledgement (e.g., acknowledgement 122) is not received by the client (e.g., one of client electronic devices 38, 40, 42, 44), the client (e.g., one of client electronic devices 38, 40, 42, 44) will retransmit the write request (e.g., write request 104) and the content (e.g., content 106) to storage system 12.

For example and when reobtaining 208 content (e.g., content 106) associated with the pre-acknowledgement data corruption, storage management process 10:

may delete 210 the memory page metadata (e.g., memory page metadata 120) that includes the pre-acknowledgement data corruption;

may delete 212 content (e.g., content 106) currently associated with the pre-acknowledgement data corruption;

may obtain 214 replacement content (e.g., content 106') associated with the pre-acknowledgement data corruption from the client (e.g., one of client electronic devices 38, 40, 42, 44), which (as discussed above) may occur automatically due to an acknowledgement (e.g., acknowledgement 122) not being received by the client;

may generate 216 replacement memory page metadata (e.g., memory page metadata 120') for the replacement content (e.g., content 106'), which may be effectuated on/by cache memory system 112; and may store 218 the replacement content (e.g., content 106') and the replacement memory page metadata (e.g., memory page metadata 120') on the cache memory system (e.g., cache memory system 112).

So with respect to the above-embedded table:

When the checksums are good (rows 1-3), storage management process 10 may look at the sequence IDs:

if the sequence IDs are both new (row 1), the write completed successfully, the data is fine, and nothing needs to be done.

if the sequence IDs are both old (row 2), a write was not started, the data is fine, and nothing needs to be done.

if the sequence IDs are both invalid (row 3), there is corruption. Accordingly, storage management process 10 may initiate 206 the data recovery process (e.g., a file system checking process, such as FSCK or CHKDSK).

When the checksums are bad (rows 4-10), storage management process 10 may look at the sequence IDs:

if the sequence IDs are mismatched (rows 4-5), there was a write split due to the power failure event (e.g., a wide spread power failure), wherein only a portion of memory page metadata 120 was written. So being an acknowledgement (e.g., acknowledgement 122) was not sent to the client, the data will be resent (as described above) by the client.

if the sequence IDs are both invalid (row 6), there is corruption. Accordingly, storage management process 10 may initiate 206 the data recovery process (e.g., a file system checking process, such as FSCK or CHKDSK).

if the sequence IDs both match (rows 7-8), there is corruption. Accordingly, storage management process 10 may initiate 206 the data recovery process (e.g., a file system checking process, such as FSCK or CHKDSK).

if one sequence ID is invalid (rows 9-10), there may be corruption. Accordingly, storage management process 10 may initiate 206 the data recovery process (e.g., a file system checking process, such as FSCK or CHKDSK).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
    processing memory page metadata received from a cache memory system within a data storage system to determine if the memory page metadata includes corruption due to a power failure event, wherein the memory page metadata identifies a location of a memory page within the cache memory system and includes header information, a payload, and footer information, wherein processing memory page metadata received from a cache memory system within a data storage system to determine if the memory page metadata includes corruption due to a power failure event includes:
    comparing a sequence ID included within the header information of the memory page metadata to a sequence ID included within the footer information, and
    examining a checksum included within the memory page metadata to determine if the memory page metadata was corrupted during the power failure event, wherein the checksum is a checksum of the header information and the payload,
    wherein a bad checksum in combination with a mismatch between the sequence ID included within the header information and the sequence ID included within the footer information indicates a write split due to the power failure event, and
    wherein a bad checksum in combination with the sequence IDs in both the header information and the footer information being either invalid or matched indicates data corruption during the power failure event;
    in response to the sequence IDs in both the header information and the footer information being invalid, initiating a data recovery process to attempt to recover content associated with data corruption, wherein the data recovery process includes a File System Consistency Check (FSCK); and
    in response to a bad checksum in combination with a mismatch between the sequence ID included within the header information and the sequence ID included within the footer information, reobtaining content associated with pre-acknowledgement data corruption.

2. The computer-implemented method of claim 1 wherein reobtaining content associated with the pre-acknowledgement data corruption includes:
    deleting the memory page metadata that includes the pre-acknowledgement data corruption; and
    deleting content currently associated with the pre-acknowledgement data corruption.

3. The computer-implemented method of claim 2 wherein reobtaining content associated with the pre-acknowledgement data corruption further includes:
    obtaining replacement content associated with the pre-acknowledgement data corruption from a client; and
    generating replacement memory page metadata for the replacement content.

4. The computer-implemented method of claim 3 wherein reobtaining content associated with the pre-acknowledgement data corruption further includes:
    storing the replacement content and the replacement memory page metadata on the cache memory system.

5. A computer program product residing on a computer readable medium having a plurality of instructions stored thereon which, when executed by a processor, cause the processor to perform operations comprising:
    processing memory page metadata received from a cache memory system within a data storage system to determine if the memory page metadata includes corruption due to a power failure event, wherein the memory page metadata identifies a location of a memory page within the cache memory system and includes header information, a payload, and footer information, wherein processing memory page metadata received from a cache memory system within a data storage system to determine if the memory page metadata includes corruption due to a power failure event includes:
    comparing a sequence ID included within the header information of the memory page metadata to a sequence ID included within the footer information, and
    examining a checksum included within the memory page metadata to determine if the memory page metadata was corrupted during the power failure event, wherein the checksum is a checksum of the header information and the payload,
    wherein a bad checksum in combination with a mismatch between the sequence ID included within the header information and the sequence ID included within the footer information indicates a write split due to the power failure event, and
    wherein a bad checksum in combination with the sequence IDs in both the header information and the footer information being either invalid or matched indicates data corruption during the power failure event;
    in response to the sequence IDs in both the header information and the footer information being invalid, initiating a data recovery process to attempt to recover content associated with data corruption, wherein the data recovery process includes a File System Consistency Check (FSCK); and in response to a bad checksum in combination with a mismatch between the sequence ID included within the header information and the sequence ID included within the footer information, reobtaining content associated with pre-acknowledgement data corruption.

6. The computer program product of claim 5 wherein reobtaining content associated with the pre-acknowledgement data corruption includes:
   deleting the memory page metadata that includes the pre-acknowledgement data corruption; and
   deleting content currently associated with the pre-acknowledgement data corruption.

7. The computer program product of claim 6 wherein reobtaining content associated with the pre-acknowledgement data corruption further includes:
   obtaining replacement content associated with the pre-acknowledgement data corruption from a client; and
   generating replacement memory page metadata for the replacement content.

8. The computer program product of claim 7 wherein reobtaining content associated with the pre-acknowledgement data corruption further includes:
   storing the replacement content and the replacement memory page metadata on the cache memory system.

9. A computing system including a processor and memory configured to perform operations comprising:
   processing memory page metadata received from a cache memory system within a data storage system to determine if the memory page metadata includes corruption due to a power failure event, wherein the memory page metadata identifies a location of a memory page within the cache memory system and includes header information, a payload, and footer information, wherein processing memory page metadata received from a cache memory system within a data storage system to determine if the memory page metadata includes corruption due to a power failure event includes:
      comparing a sequence ID included within the header information of the memory page metadata to a sequence ID included within the footer information, and
      examining a checksum included within the memory page metadata to determine if the memory page metadata was corrupted during the power failure event, wherein the checksum is a checksum of the header information and the payload,
   wherein a bad checksum in combination with a mismatch between the sequence ID included within the header information and the sequence ID included within the footer information indicates a write split due to the power failure event, and
   wherein a bad checksum in combination with the sequence IDs in both the header information and the footer information being either invalid or matched indicates data corruption during the power failure event;
   in response to the sequence IDs in both the header information and the footer information being invalid, initiating a data recovery process to attempt to recover content associated with data corruption, wherein the data recovery process includes a File System Consistency Check (FSCK); and
   in response to a bad checksum in combination with a mismatch between the sequence ID included within the header information and the sequence ID included within the footer information, reobtaining content associated with pre-acknowledgement data corruption.

10. The computing system of claim 9 wherein reobtaining content associated with the pre-acknowledgement data corruption includes:
    deleting the memory page metadata that includes the pre-acknowledgement data corruption; and
    deleting content currently associated with the pre-acknowledgement data corruption.

11. The computing system of claim 10 wherein reobtaining content associated with the pre-acknowledgement data corruption further includes:
    obtaining replacement content associated with the pre-acknowledgement data corruption from a client; and
    generating replacement memory page metadata for the replacement content.

12. The computing system of claim 11 wherein reobtaining content associated with the pre-acknowledgement data corruption further includes:
    storing the replacement content and the replacement memory page metadata on the cache memory system.

13. The computer-implemented method of claim 1, wherein the payload includes client-specific information.

* * * * *